United States Patent Office 3,478,845
Patented Nov. 18, 1969

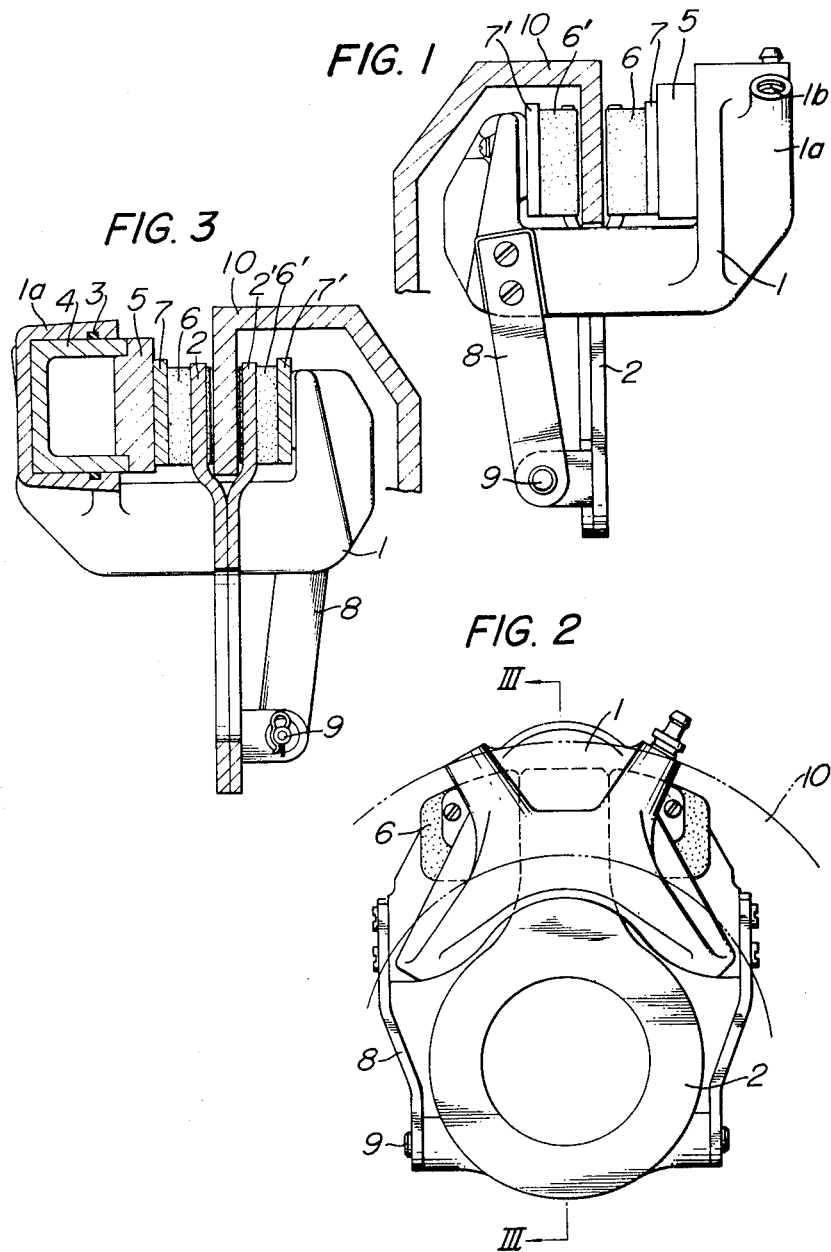

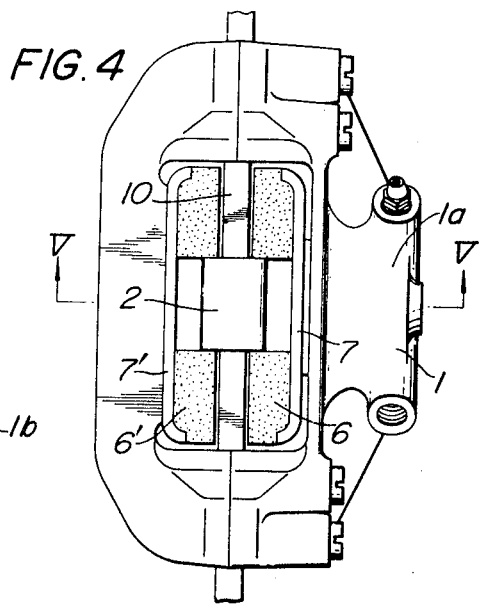
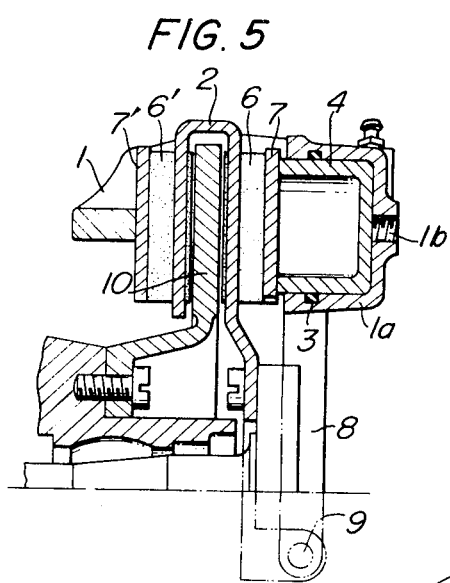
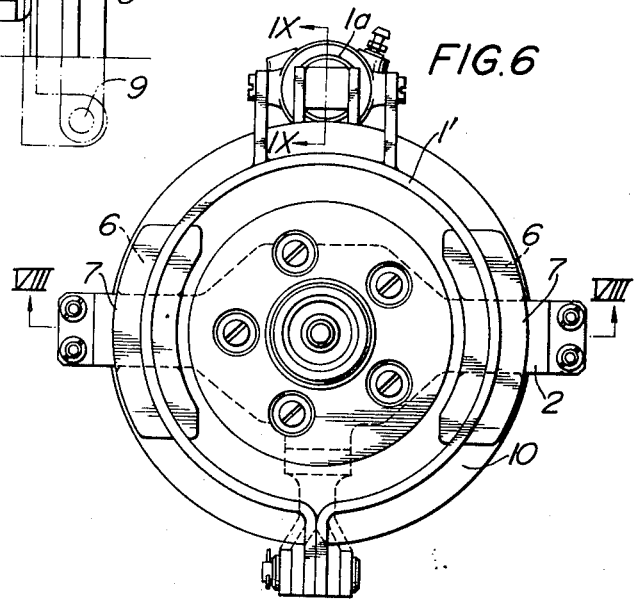

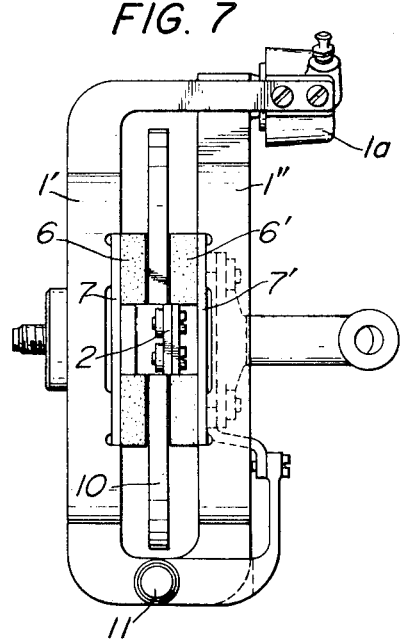
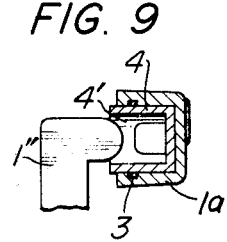
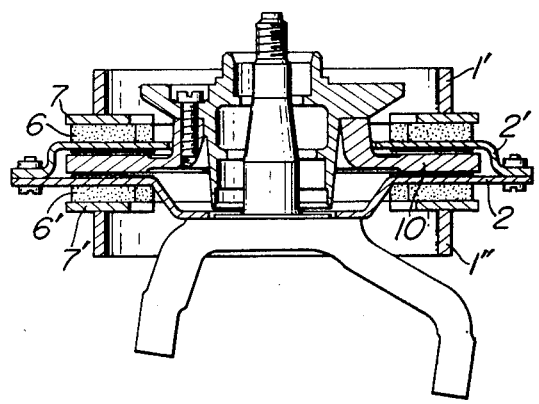

3,478,845
CALIPER TYPE DISC BRAKE
Yasuo Kita, Nishinomiya-shi, Japan, assignor to Sumitomo Electric Industries, Ltd., Higashi-ku, Osaka, Japan, a corporation of Japan
Filed Nov. 7, 1967, Ser. No. 681,164
Claims priority, application Japan, Nov. 9, 1966, 41/73,245
Int. Cl. F16d 55/224
U.S. Cl. 188—73　　　　　　　　　　　　　　9 Claims

ABSTRACT OF THE DISCLOSURE

A disc brake having two pairs of spaced friction pads disposed on opposite sides of a rotatable brake disc, and a restraining member which extends into the space defined between the pads of the pad pairs. The restraining member acts to restrain the frictionally rotating movement of the friction pads integrally with the brake disc when the braking force is applied to the brake disc by the friction pads.

---

The present invention relates to a disc brake, and more particularly to a disc brake characterized in that the brake disc is positioned intermediate between opposite pairs of pads which are operatively associated with a single stationary member in such a manner that quite the same operation is done by the pads in the braking operation in both the normal and reverse revolutions.

Conventional disc brakes are equipped with a pair of pads which are operably disposed opposite to each other in a caliper, and since a force is imparted during the braking operation in such a manner as to cause rotary movement of the pads in unitary relation with the disc, it is generally necessary to provide supporting members for the respective pads to receive the above force and to maintain the pads in the predetermined position at the time of the braking against the disc rotating in the normal or reverse direction. The prior disc brake has thus been defective in view of its uneconomical construction in which one of the pads remains idle when the other is in action. The above uneconomical construction has led to an undesirable increase in the volume and weight of the whole unit.

It is therefore the primary object of the present invention disc brake structure which is free from the abovementioned shortcoming.

The above and other objects, advantages and features of the present invention will become apparent from the following description with reference to the accompanying drawings, in which like reference numerals are used throughout to denote like parts.

In the drawings:

FIG. 1 is a partly sectional side view of an embodiment of the disc brake according to the present invention;

FIG. 2 is a front elevational view of the disc brake shown in FIG. 1;

FIG. 3 is a sectional view taken on the line III—III in FIG. 2;

FIG. 4 is a plan view of another embodiment according to the present invention;

FIG. 5 is a sectional view taken on the line V—V in FIG. 4;

FIG. 6 is a front elevational view of a further embodiment according to the present invention;

FIG. 7 is a plan view of the disc brake shown in FIG. 6;

FIG. 8 is a sectional view taken on the line VIII—VIII in FIG. 6; and

FIG. 9 is a sectional view taken on the line IX—IX in FIG. 6.

A few preferred embodiments of the present invention will now be described in detail with reference to the drawings. The first embodiment shown in FIGS. 1–3, includes a caliper 1 with which a hydraulic cylinder 1a is made integral. In the said cylinder 1 is slidably received a piston 4 which is made fluid-tight by means of a piston seal 3. On one side of a brake disc 10, there are one pair of pads 6 fixed unitarily to the piston 4 through the intermediary of a pressure plate 5 and a backing plate 7, while on the other side of the brake disc 10, there are another pair of pads 6' which is carried by the caliper 1 and fixed to a backing plate 7' disposed on the other side of the backing plate 7 with respect to the disc 10, the latter pads 6' being positioned opposite to the aforementioned pads 6. Intermediate between the respective pairs of pads, brake plates 2 and 2' fixed to a knuckle or like fixing member are disposed in such a manner that the associated pads are slidable relative to the brake plate so as to be pressed against the faces of the brake disc, for thereby preventing the aforementioned rotary movement of the pads. A caliper carrying arm 8 has one end thereof fixed to the caliper 1 and the other end thereof pivoted to the brake plates 2 and 2' by a pivot pin 9.

The device with the abovementioned construction operates in a manner as described below. When oil under pressure is introduced into the cylinder 1a through an inlet 1b for the sake of braking, the piston 4 is urged to shift to the right in FIG. 3, and the pads 6 fixed to the piston 4 abut one of the side faces of the disc 10.

As the piston 4 is further urged, the caliper 1 swings to the left about the pivot pin 9, and the other pads 6' are brought into contact with the other face of the disc 10, with the result that the pads 6' cooperate with the pads 6 to apply pressure to the opposite faces of the brake disc 10. In the meantime, the frictional rotating force generated in each of the pairs of pads is restrained by the brake plates 2 and 2' interposed between the respective pad pairs, and thus the pads 6 and 6' can effectively brake the revolution of the disc 10.

In the second embodiment shown in FIGS. 4 and 5, a caliper 1 provided with a hydraulic cylinder 1a, and a brake plate 2 fixed to a knuckle or like fixing member are positioned outside of a disc 10. In further detail, respective pairs of pads 6 and 6' are, as in the first embodiment, fixed to a piston 4 and the caliper 1, respectively, through backing plates 7 and 7'. The brake plate 2 is disposed intermediate between the opposite pairs of the pads 6 and 6' in such a manner the pads are slidable so as to be pressed against the faces of the brake disc. As in the first embodiment, a caliper carrying arm 8 has one end thereof pivoted to the brake plate 2 by a pivot pin 9 and the other end thereof fixed to the body of the caliper 1.

FIGS. 6–9 show a third embodiment of the invention. Pairs of pads 6 and 6' are disposed opposite to each other at the places on opposite sides of the peripheral edge portion of a disc 10, and brake plates 2 and 2' mounted on a fixed member are so disposed that they extend in the diametral direction of the disc 10 and are connected at opposite outside of the circumference ends to form a substantially closed structure which straddles and encompasses the disc 10. The body portion 1' having a cylinder 1a mounted thereon and the body portion 1" operatively associated with a piston 4 are swingable about a pivot pin 11, and support thereon the respective pads 6 and 6' through backing plates 7 and 7' with the disc 10 interposed therebetween. Oil under pressure fed into the cylinder 1a acts on the piston 4 to urge one of the body portions 1" via a member 4', and at the same time to cause the other body portion 1' to swing in the direction opposite to pressure applying direction, thus the pads 6 and 6' cooperating to restrict the revolution of the disc 10. The revolving force applied to the pads is received by the aforementioned brake plates 2 and 2'.

In each of the embodiments, the brake plates 2 and/or 2' include elongate elements disposed in the spaces or slots between pairs of pads 6 and 6'. These elements provide the sole means for restraining the pads 6 and 6' against movement with the disc 10 and in each case the pads are free from engagement with any restraining or torque receiving structure at the edges thereof remote from the space (or slot) between the pads of each pair thereof.

The present invention has been explained with reference to a disc brake of the type having a piston and a cylinder only on one side of the disc. However, it must be understood that the invention is obviously applicable also to a disc brake of the type having pistons and cylinders on both sides of the disc, which type is therefore also within the scope of the present invention.

As will be apparent from the embodiments described hereinabove, the disposition of a brake plate between each pair of pads in the disc brake structure according to the present invention is quite effective in that the braking force can thereby be entirely similarly imparted to the brake disc in its rotation in both the normal and reverse directions. Since further the rotary movement of the pads can be directly stopped by a stationary member through the brake plate, the structure of the caliper can be simplified compared with the conventional structure in which the rotary movement of the pads are stopped by a portion of the caliper, and thus the desired purpose of reduction in the volume and weight of the disc brake device can be successfully attained.

What is claimed is:

1. A disc brake for a rotary member, said brake comprising:
   a brake disc mounted for rotation with the rotary member;
   a pair of friction pads;
   a support mounting the pads in fixed side-by-side relationship adjacent one radially extending side of the disc,
   said pads being spaced circumferentially of the disc presenting a radially extending slot therebetween,
   said support being shiftable toward the disc for forcing the pads agains said side of the disc; and
   a fixed, elongated restraining member disposed substantially entirely within said slot restraining one pad against movement with the disc in one direction and restraining the other pad against movement with the disc in the other direction,
   the movement of said one pad in the other direction and the movement of said other pad in said one direction being restrained by said support,
   said pads being free from engagement with any restraining or torque receiving structure at the edges thereof remote from said slot.

2. A disc brake for a rotary member, said brake comprising:
   a brake disc mounted for rotation with the rotary member;
   a pair of friction pads;
   a supporting mounting the pads in fixed side-by-side relationship adjacent one radially extending side of the disc,
   said pads being spaced circumferentially of the disc presenting a radially extending slot therebetween,
   said support being shiftable toward the disc for forcing the pads against said side of the disc; and
   an elongated restraining member disposed substantially entirely within said slot restraining one pad against movement with the disc in one direction and restraining the other pad against movement with the disc in the other direction,
   one end of said member being fixed relative to said disc and said support, the opposite end of said member being relatively free and supported solely by its internal stability,
   said pads being free from engagement with any restraining or torque receiving structure at the edges thereof remote from said slot.

3. A disc brake for a rotary member, said brake comprising:
   a brake disc mounted for rotation with the rotary member;
   a first pair of friction pads;
   a first support mounting the first pair of pads in fixed side-by-side relationship adjacent one radially extending side of the disc;
   a second pair of friction pads;
   a second support mounting the second pair of pads in fixed side-by-side relationship adjacent the opposite radially extending side of the disc,
   said supports being shiftable toward the disc for forcing the pads against said sides of the disc,
   the pads of each pair being spaced circumferentially of the disc, each pair presenting a radially extending slot therebetween;
   an elongated, generally U-shaped restraining member having one leg disposed in one slot, another leg disposed in the other slot and a bight interconnecting the legs,
   said pads being free from engagement with any restraining or torque receiving structure at the edges thereof remote from said slots.

4. A disc brake as set forth in claim 3 wherein said bight is disposed radially outwardly of the disc.

5. A disc brake according to claim 4 wherein the end of one of the legs remote from the bight is fixed relative to said disc and said supports, the remainder of said member being relatively free and supported solely by its internal stability.

6. A disc brake of the type having a brake disc mounted on a rotary member for unitary rotation therewith, at least one pair of friction pad means disposed on each side of said disc in order to apply a braking force to the opposite faces of said disc, a caliper carrying said friction pad means thereon and disposed to partly straddle the peripheral portion of said disc, said caliper being nonrotatable relative to said disc, a hydraulic cylinder provided in said caliper, and a piston slidably received in said cylinder so as to advance toward said disc by being urged by a hydraulic fluid for thereby forcing said pads onto the opposite faces of said disc to apply the brake action, wherein each pad means comprises two pads arranged in side-by-side relationship circumferentially around the disc with a space of suitable dimensions defined between said two pads, and a restraining member for retaining said pads at the predetermined position, said restraining member comprising a radially extending elongate element disposed in each space while allowing the sliding movement of the associated pads toward and away from said disc relative to said elongate member, said friction pads being free from engagement with any restraining or torque receiving structure at the edges thereof remote from said space.

7. A disc brake according to claim 6, in which each elongate element slidably extends at one end into its corresponding space.

8. A disc brake according to claim 6, in which said elongate elements are connetced at one end so as to partly encompass the peripheral portion of said disc.

9. A disc brake according to claim 6, in which said elongate elements each extend in the diametral direction of said disc, and are connected to form a substantially U-shaped structure which partly straddles and encompasses the outer peripheral portion of said disc.

References Cited

UNITED STATES PATENTS

| | | | |
|---|---|---|---|
| 3,053,346 | 9/1962 | Butler | 188—73 |
| 3,077,246 | 2/1963 | Redmayne et al. | 188—73 |
| 3,109,518 | 11/1963 | Chouings | 188—73 |
| 3,299,991 | 1/1967 | De Costelet | 188—73 |
| 3,354,992 | 11/1967 | Cook et al. | 188—73 |

FOREIGN PATENTS 1,116,603  11/1961  Germany.

GEORGE E. A. HALVOSA, Primary Examiner